(12) United States Patent
Mahr et al.

(10) Patent No.: US 8,343,312 B2
(45) Date of Patent: Jan. 1, 2013

(54) POLYMER-PIGMENT HYBRIDS FOR USE IN PAPERMAKING

(75) Inventors: Norbert Mahr, Limburgerhof (DE); Dieter Meck, Freinsheim (DE); Rainer Blum, Mannheim (DE); Ralf Hemel, Ludwigshafen (DE); Norbert Gispert, Worms-Horchheim (DE); Juergen Schmidt-Thuemmes, Neuhofen (DE); Christoph Hamers, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 734 days.

(21) Appl. No.: 11/915,682

(22) PCT Filed: May 24, 2006

(86) PCT No.: PCT/EP2006/062560
§ 371 (c)(1), (2), (4) Date: Nov. 27, 2007

(87) PCT Pub. No.: WO2006/128814
PCT Pub. Date: Dec. 7, 2006

(65) Prior Publication Data
US 2008/0210394 A1 Sep. 4, 2008

(30) Foreign Application Priority Data
May 31, 2005 (DE) .......................... 10 2005 025 374

(51) Int. Cl.
*D21H 17/69* (2006.01)
*D21H 17/63* (2006.01)
*D21H 21/00* (2006.01)

(52) U.S. Cl. ..................... 162/169; 162/158; 162/164.1; 162/168.1; 162/181.1; 162/181.2; 162/181.3; 162/181.4; 162/181.8; 162/185; 106/400; 106/416; 106/436; 106/461; 106/499; 524/425; 524/445

(58) Field of Classification Search .................. 162/158, 162/164.1, 168.1, 181.1–181.4, 181.8, 169, 162/185; 106/400, 416, 436, 437, 461, 499
See application file for complete search history.

(56) References Cited

U.S. PATENT DOCUMENTS

| 4,124,562 | A | * | 11/1978 | Yui et al. ........................ 523/209 |
| 6,646,023 | B1 | * | 11/2003 | Nyssen .......................... 523/122 |
| 2004/0250972 | A1 | * | 12/2004 | Carr ........................... 162/164.1 |
| 2005/0197278 | A1 | | 9/2005 | Esser et al. |
| 2006/0009560 | A1 | * | 1/2006 | Gane et al. .................... 524/425 |
| 2007/0240619 | A1 | * | 10/2007 | Munchow ..................... 106/500 |
| 2007/0266898 | A1 | | 11/2007 | Gane et al. |
| 2007/0298261 | A1 | | 12/2007 | Schmidt-Thummes et al. |

FOREIGN PATENT DOCUMENTS

| DE | 25 16 097 A1 | 11/1975 |
| DE | 102 09 448 A1 | 9/2003 |
| DE | 103 15 363 A1 | 10/2004 |
| DE | 10 2004 054 912.5 | 11/2004 |
| DE | 10 2004 054 913.3 | 11/2004 |
| FR | 04 07 806 | 7/2004 |
| FR | 2 873 127 A1 | 1/2006 |
| GB | 1 505 641 | 3/1978 |
| JP | 63-135593 | 6/1988 |
| JP | 2003-166195 | 6/2003 |
| JP | 2006-100701 | 4/2006 |
| JP | 2008-60022 | 3/2008 |
| WO | WO 92/14881 | 9/1992 |
| WO | WO 2004041882 A1 * | 5/2004 |
| WO | WO 2006/050871 A2 | 5/2006 |
| WO | WO 2006/050873 A1 | 5/2006 |
| WO | WO 2006/066769 A2 | 6/2006 |

OTHER PUBLICATIONS

J. Peel, Paper Science & Paper Manufacture 1999, pp. 18-19.*
Machine translation of DE 10209448, The European Patent Office, [online], [retrieved on Feb. 28, 2011]. Retrieved from the Internet: <URL: http://ep.espacenet.com/?locale=EN_ep>.*
First page of German Translation of Japanese Office Action issued Jan. 21, 2011, in Japanese Patent Application No. 2008-514064.

* cited by examiner

*Primary Examiner* — Matthew Daniels
*Assistant Examiner* — Dennis Cordray
(74) *Attorney, Agent, or Firm* — Oblon, Spivak, McClelland, Maier & Neustadt, L.L.P.

(57) ABSTRACT

Process for the production of filler-containing papers and filler-containing paper products by addition of an aqueous suspension of at least one finely divided polymer-pigment hybrid to a paper stock and drainage of the paper stock with sheet formation, the polymer-pigment hybrid being obtainable by milling an aqueous suspension of at least one inorganic pigment in the presence of at least one binder and, if appropriate, by drying the aqueous suspension thus obtainable and redispersing the dried polymer-pigment hybrid in water, and the use of the polymer-pigment hybrids thus obtainable as a filler for the production of filler-containing paper or filler-containing paper products.

28 Claims, No Drawings

POLYMER-PIGMENT HYBRIDS FOR USE IN PAPERMAKING

CROSS-REFERENCE TO RELATED APPLICATIONS

The present application is a 35 U.S.C. §371 National Stage patent application of International patent application PCT/EP06/062560, filed on May 24, 2006, which claims priority to German patent application DE 102005025374.1, filed on May 31, 2005.

The invention relates to a process for the production of filler-containing papers and filler-containing paper products by addition of an aqueous suspension of at least one finely divided filler which has been treated with at least one binder to a paper stock and drainage of the paper stock with sheet formation.

DE-A 25 16 097 discloses that aqueous suspensions of inorganic particles which have a positive zeta potential are mixed with an anionic latex of a resin, the equilibrium of negative and positive charges of the particles of the inorganic substance in the suspension and of the resin in the latex during mixing being established so that substantially all resin particles are bound to the surface of the particles of the inorganic substance, and the coated particles thus obtained have a zeta potential of substantially 0. However, the treatment of the inorganic particles in a latex requires that the inorganic particles be pretreated with a cationic composition, such as cationic starch, so that they have a positive zeta potential. The aqueous suspensions are added to the paper stock during the production of filler-containing paper.

WO 92/14881 discloses a process for the preparation of aqueous suspensions of finely divided fillers which are at least partly coated with polymers for the production of filler-containing papers. In this process, first a cationic strength agent for paper and then a nonionic and/or anionic strength agent for paper or a nonionic or anionic size for paper are added to an aqueous suspension of fillers. The cationic starting materials are, however, always used in an amount such that the finely divided fillers carry a cationic charge.

DE-A 102 09 448 discloses aqueous suspensions of finely divided fillers which are at least partly coated with polymers. These products are obtained by treating aqueous suspensions of inorganic particles with at least one binder for paper coating slips; for example, the components are mixed by stirring or they are subjected to the action of shearing forces in an Ultraturrax apparatus. The polymer-pigment suspensions thus obtainable are used for the production of filler-containing papers.

Further aqueous suspensions of finely divided fillers which are at least partly coated with polymers are described in DE-A 103 15 363. They are obtained by treating aqueous suspensions of finely divided fillers with at least one water-soluble amphoteric copolymer which is obtainable by (i) copolymerization of at least one N-vinylcarboxamide and at least one monoethylenically unsaturated carboxylic acid and, if appropriate, other monomers and (ii) subsequent partial or complete elimination of the carboxyalkyl groups from the vinylcarboxamide units of the polymers with formation of amino groups. The electrophoretic mobility of the filler particles is established, for example, so that it is negative or at most zero at pH 7. The aqueous suspensions of the finely divided fillers modified with these polymers are added to the paper stock in papermaking. Filler-containing paper products, such as paper, board and cardboard, are obtained.

The prior German Application 10 2004 054 913.3 discloses a paper coating slip which comprises at least one inorganic pigment and, based on 100 parts by weight of the inorganic pigments, less than 40 parts by weight of at least one organic polymer and less than 25 parts by weight of water or other solvents. The paper coating slip is applied to the paper or cardboard by a dry coating method. It comprises, as a filler, a polymer-pigment hybrid which is obtainable, for example, by drying a mixture of pigment and binder or by milling a pigment in the presence of a binder.

The prior German Application 10 2004 054 912.5 relates to an aqueous paper coating slip which comprises organic polymers as binders and inorganic pigments, the binders being present at least partly in the form of a polymer-pigment hybrid. The pigment-polymer hybrid is obtainable by milling an inorganic pigment in the presence of the binder.

The prior French Application 04 07 806 discloses a process for the preparation of finely divided polymer-pigment hybrids which comprise at least one pigment and at least one binder and are present as powder, in a suspension or in an aqueous dispersion. The polymer-pigment hybrid particles are obtainable by milling an aqueous suspension of at least one inorganic pigment and at least one solution, suspension or aqueous dispersion of at least one binder together in a mill and, if appropriate, drying the aqueous suspension thus obtainable. The aqueous suspension of the polymer-pigment hybrid comprises, for example, from 5 to 80% by weight of at least one inorganic pigment, from 1 to 30% by weight of at least one binder and from 19 to 94% by weight of water.

It is the object of the invention to provide a process for the production of filler-containing paper and paper products, paper products comprising fillers and having improved strength and/or printability in combination with identical or improved runability of the paper machine compared with the known processes being obtained.

The object is achieved, according to the invention, by a process for the production of filler-containing papers and filler-containing paper products by addition of an aqueous suspension of at least one finely divided filler which has been treated with at least one binder to a paper stock and drainage of the paper stock with sheet formation, if the filler used is a polymer-pigment hybrid which is obtainable by milling an aqueous suspension of at least one inorganic pigment in the presence of at least one binder and, if appropriate, by drying the aqueous suspension thus obtainable and redispersing the dried polymer-pigment hybrid in water.

Aqueous suspensions of at least one polymer-pigment hybrid which are thus obtainable are metered into the paper stock in an amount such that paper or paper products having a filler content of from 5 to 60% by weight, preferably from 15 to 40% by weight, based in each case on dried paper stock, are obtained. The aqueous suspensions of fillers can be added both to the high-consistency pulp and to the low-consistency pulp during papermaking. They can be used in the presence of the additives customary in papermaking, such as engine sizes, fixing agents, drainage aids, strength agents, retention aids and/or dyes.

The aqueous, finely divided pigment hybrid suspension can be used for the production of all filler-containing paper qualities, for example newsprint, SC papers (supercalendered papers), wood-free or wood-containing writing and printing papers. For the production of such papers, for example, groundwood, thermomechanical pulp (TMP), chemothermomechanical pulp (CTMP), biological chemothermomechanical pulp (BCTMP), pressure groundwood (PGW) and sulfite and sulfate pulp are used as main components. The basis weight of the filler-containing papers is, for example, from 16 to 600 g/m$^2$, preferably from 50 to 120 g/m$^2$. Paper products are to be understood as meaning, for example, board and cardboard, which are likewise produced by drainage of a filler-containing paper stock but have a higher basis weight and a different structure compared with paper.

In order to achieve a higher filler retention, it is advisable to add retention aids to the paper stock. The retention aids can be added, for example, to the high-consistency stock or to the low-consistency stock. Retention aids used are, for example, high molecular weight polyacrylamides (the molar masses of the polymers are above 2 million), polyethylenimines, polymers comprising polyvinylamine units, in particular polyvinylamine, or so-called microparticle systems are used, a polymeric cationic retention aid first being added to the paper stock, the paper stock then being subjected to shearing, and bentonite or finely divided silica then being added in amounts of up to 2% by weight, based on dry fiber. According to another microparticle process, the microparticle system comprising a cationic polymer and a finely divided inorganic component is metered into the paper stock only after the final shearing stage, before the headbox.

In the production of wood-free papers, at least one optical brightener may additionally be introduced into the paper stock. The amounts of optical brightener are, for example, from 0.3 to 3.0, preferably from 0.6 to 1.5, % by weight, based on dry paper stock.

Use of the polymer-pigment hybrids in papermaking has the advantage that papers which have a high strength, in particular a high surface strength are obtained. With the use of such papers in the printing or copying process, reduced dust formation and a lower level of deposition on the rollers are observed in comparison with filler-containing papers produced in a known manner. With the aid of the pigment hybrids, it is possible to produce filler-comprising papers which have a significantly higher filler content compared with papers produced using other pigments, owing to the higher strengths. This advantage is observed both in the case of wood-free and in the case of wood-containing papers. Owing to the high surface strength and the good toner adhesion, filler-containing papers which were produced using polymer-pigment hybrids require no further surface finishing, which is otherwise carried out in the size press. Since the porosity of the paper can be controlled by using the polymer-pigment hybrids, it is also possible in papermaking to use fibers having a lower freeness than otherwise usual. By the controlled use of polymer-pigment hybrids for the production of multilayer papers, further optimization of the stiffness of the paper thus obtainable is possible.

For the preparation of a polymer-pigment hybrid, for example, it is possible to adopt a procedure in which a 1 to 80% strength by weight aqueous suspension of at least one inorganic pigment based on, for example, metal oxides, silicates and/or carbonates, in particular of pigments from the group consisting of titanium dioxide, alumina, aluminum hydroxide, such as, in particular, aluminum trihydroxide, zinc oxide, kaolin, talc, dolomite, clay, bentonite, satin white, calcium carbonate, naturally occurring calcium sulfate (gypsum), calcium sulfate from chemical processes and/or barium sulfate is milled in the presence of a natural and/or synthetic binder. These are the inorganic substances usually used as a filler in papermaking. Most fillers are naturally occurring minerals or products which form in production processes in industry, such as calcium sulfate or precipitated calcium carbonate. The pigments or fillers which are used in papermaking are as a rule obtained by comminution of minerals in the form of coarse fragments. In order to obtain pigments for papermaking, the suitable minerals can be subjected, for example, to dry and/or wet milling. For the preparation of the polymer-pigment hybrids, it is preferable to start from minerals which have already been comminuted beforehand and which may have, for example, a mean particle size in the range from 1 µm to 2 mm, preferably from 1 µm to 100 µm. An aqueous suspension of the pigments is first prepared. The temperature during the milling of the components may vary within a wide range, for example may be from 0 to 95° C. In most cases, the temperature is from 15 to 80° C., in particular from 20 to 55° C.

The pigment concentration in the aqueous suspension is preferably from 15 to 60% by weight. At least one natural and/or synthetic binder is then added to the suspension and the mixture is then subjected to a milling process, for example in a ball mill. The wet milling of the two components is preferred. For example, finely divided polymer-pigment hybrids having a mean particle diameter of from 0.01 to 50 µm, for example also from 0.1 to 30 µm, are then obtained in the wet state.

The two components can, however, also be milled in the dry state.

The aqueous suspensions of polymer-pigment hybrids can be dried, for example by spray drying.

The polymer-pigment hybrids have self-binding properties, as described in example 1 of FR-A 04 07 806.

In the preparation of the polymer-pigment hybrid, for example, a weight ratio of inorganic pigment to binder of between 99.9 and 1, preferably between 70 and 30, is chosen. The aqueous suspension of the polymer-pigment hybrid comprises in general from 5 to 80% by weight, preferably from 20 to 40% by weight, at least one inorganic pigment, from 0.1 to 30% by weight, preferably from 5 to 20% by weight, of at least one binder and from 19 to 94% by weight, preferably from 40 to 75% by weight, of water.

Polymer-pigment hybrids which are prepared using calcium carbonate in the form of lime, chalk, calcite, marble and/or precipitated calcium carbonate as the inorganic pigment are particularly preferred.

For the preparation of polymer-pigment hybrids, natural and/or synthetic binders can be used. Examples of natural binders are starch, casein, the proteins, carboxymethylcellulose and/or ethylhydroxyethylcellulose.

Suitable synthetic binders are, for example, polymers which are composed of at least 40% by weight of so-called main monomers, selected from $C_1$- to $C_{20}$-alkyl(meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers.

Particularly suitable synthetic polymers are polymers which are obtainable by free radical polymerization of ethylenically unsaturated compounds (monomers).

The binder is preferably a polymer which comprises at least 40% by weight, preferably at least 60% by weight, particularly preferably at least 80% by weight, of so-called main monomers.

The main monomers are selected from $C_1$-$C_{20}$-alkyl(meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers.

Alkyl(meth)acrylates having a $C_1$-$C_{10}$-alkyl radical, such as methyl methacrylate, methyl acrylate, n-butyl acrylate, ethyl acrylate and 2-ethylhexyl acrylate, may be mentioned by way of example.

In particular, mixtures of the alky(meth)acrylates are also suitable.

Vinyl esters of carboxylic acids and 1 to 20 carbon atoms are, for example, vinyl laurate, vinyl stearate, vinyl propionate, vinyl versatate and vinyl acetate.

Suitable vinylaromatic compounds are vinyltoluene, $\alpha$- and p-methylstyrene, $\alpha$-butylstyrene, 4-n-butylstyrene, 4-n-decylstyrene and preferably styrene. Examples of nitriles are acrylonitrile and methacrylonitrile.

The vinyl halides are chlorine-, fluorine- or bromine-substituted ethylenically unsaturated compounds, preferably vinyl chloride and vinylidene chloride.

Vinyl methyl ether or vinyl isobutyl ether may be mentioned by way of example as vinyl ethers. Vinyl ethers of alcohols comprising 1 to 4 carbon atoms are preferred.

Ethylene, propylene, butadiene, isoprene and chloroprene may be mentioned as hydrocarbons having 2 to 8 carbon atoms and one or two olefinic double bonds.

Preferred main monomers are $C_1$-$C_{10}$-alkyl(meth)acrylates and mixtures of alkyl(meth)acrylates with vinylaromatics, in particular styrene, (polymers comprising these main monomers are together referred to as polyacrylates for short), or, alternatively, hydrocarbons having 2 double bonds, in particular butadiene, or mixtures of such hydrocarbons of vinylaromatics, in particular styrene (polymers comprising these main monomers are referred to together as polybutadienes for short).

In the case of mixtures of aliphatic hydrocarbons (in particular butadiene) with vinylaromatics (in particular styrene), the ratio may be, for example, from 10:90 to 90:10, in particular from 20:80 to 80:20.

In addition to the main monomers, the polymer may comprise monomers having at least one acid group (acid monomer for short), for example monomers comprising carboxyl, sulfo or phosphonic acid groups. Carboxyl groups are preferred. Acrylic acid, methacrylic acid, itaconic acid, maleic acid or fumaric acid may be mentioned by way of example.

Further monomers are moreover, for example, monomers comprising hydroxyl groups, in particular $C_1$-$C_{10}$-hydroxyalkyl(meth)acrylates, and (meth)acrylamide.

In the case of the polybutadienes, particularly preferred polymers are accordingly composed of from 10 to 90% by weight, preferably from 20 to 70% by weight, of aliphatic hydrocarbons having two double bonds, in particular butadiene from 10 to 90% by weight, preferably from 30 to 80% by weight, of vinylaromatic compounds, in particular styrene from 0 to 20% by weight, preferably from 0 to 10% by weight, of acid monomer from 0 to 20% by weight, preferably from 0 to 10% by weight, of further monomers or alternatively, in the case of the polyacrylates, of from 10 to 95% by weight, preferably from 30 to 95% by weight, of $C_1$- to $C_{10}$-alkyl(meth)acrylates, from 0 to 60% by weight, preferably from 0 to 50% by weight, of vinylaromatic compounds, in particular styrene, and from 0 to 20% by weight, preferably from 0 to 10% by weight, of acid monomer and from 0 to 20% by weight, preferably from 0 to 10% by weight, of further monomers.

Both the polybutadienes and the polyacrylates preferably comprise acid monomers as comonomers, preferably in an amount of from 1 to 5% by weight. The maximum amount of the above aliphatic hydrocarbons in the case of the polybutadienes or of the alkyl(meth)acrylates in the case of the polyacrylate is correspondingly reduced by the minimum amount of the acid monomers.

The preparation of the polymers is effected in a preferred embodiment by emulsion polymerization, and this polymer is therefore an emulsion polymer. However, the polymer can also be prepared, for example, by solution polymerization and subsequent dispersing of the polymer solution in water.

In the emulsion polymerization, ionic and/or nonionic emulsifiers and/or protective colloids or stabilizers are usually used as surface-active compounds.

The surface-active substance is used, for example, in amounts of from 0.1 to 10 by weight, based on the monomers to be polymerized.

Water-soluble initiators for the emulsion polymerization are, for example, ammonium and alkali metal salts of peroxodisulfuric acid, e.g. sodium peroxodisulfate, hydrogen peroxide or organic peroxides, e.g. tert-butyl hydroperoxide.

So-called reduction-oxidation (redox) initiator systems are also suitable.

The amount of the initiators is in general from 0.1 to 10% by weight, preferably from 0.5 to 5% by weight, based on the monomers to be polymerized. It is also possible to use a plurality of different initiators in emulsion polymerization.

In the polymerization, it is possible to use regulators, for example in amounts of from 0 to 0.8 part by weight, based on 100 parts by weight of the monomers to be polymerized, by means of which the molar mass is reduced. For example, compounds having a thiol group, such as tert-butyl mercaptan, ethylacrylic ester of thioglycolic acid, mercaptoethynol, mercaptopropyltrimethoxysilane or tert-dodecyl mercaptan.

The emulsion polymerization is effected as a rule at from 30 to 130° C., preferably from 50 to 90° C. The polymerization medium may comprise either exclusively water or mixtures of water and liquid miscible therewith, such as methanol. Preferably, exclusively water is used. The emulsion polymerization can be carried out both as a batch process or in the form of a feed process, including a stepwise or gradient procedure. Preference is given to the feed process, in which a part of the polymerization batch is initially taken, heated to the polymerization temperature and begins to polymerize and then the remainder of the polymerization batch is fed to the polymerization zone, usually via a plurality of spatially separated feeds, one or more of which comprise the monomers in pure or in emulsified form, continuously, stepwise or with superposition of a concentration gradient, while maintaining the polymerization. In the polymerization, it is also possible initially to take polymer seed, for example for better adjustment of the particle size.

The manner in which the initiator is added to the polymerization vessel in the course of the free radical aqueous emulsion polymerization is known to the average person skilled in the art. It may either be completely initially taken in the polymerization vessel or used continuously or stepwise at the rate of its consumption in the course of the free radical aqueous emulsion polymerization. Specifically, this depends on the chemical nature of the initiator system as well as on the polymerization temperature. Preferably, a part is initially taken and the remainder is fed to the polymerization zone at the rate of consumption.

For removing residual monomers, initiator is usually added even after the end of the actual emulsion polymerization, i.e. after a conversion of monomers of at least 95%.

In the feed process, the individual components can be added to the reactor from above, at the side or from below through the reactor bottom.

In the emulsion polymerization, aqueous dispersions of the polymer, as a rule having solids contents of from 15 to 75% by weight, preferably from 40 to 75% by weight, are obtained.

Particularly suitable binders are also mixtures of various binders, for example also mixtures of synthetic and natural polymers. Aqueous polymer dispersions which are composed of at least 60% by weight of butadiene or mixtures of butadiene and styrene or aqueous dispersions of polymers which comprise at least 60% by weight of $C_1$- to $C_{20}$-alkyl(meth)acrylates or mixtures of $C_1$- to $C_{20}$-alkyl(meth)acrylates with styrene, incorporated in the form of polymerized units, are preferably used as the binder.

Further suitable binders are polymers which comprise vinylformamide and/or vinylamine units and have an average molar mass $M_w$ of at least 10 000. These polymers may be present as an aqueous dispersion or as a solution in water. They are prepared, for example, by polymerization of N-vinylformamide alone or in the presence of at least one other nonionic, cationic and/or anionic monomer. The homo- and copolymers of N-vinylformamide which can be prepared in this manner can be hydrolyzed in a polymer-analogous reaction with elimination of formyl groups from the polymerized vinylformamide units with formation of amino groups. The hydrolysis is preferably effected in an aqueous medium in the presence of at least one acid, such as hydrochloric acid or sulfuric acid, enzymatically or in the presence of bases, such as sodium hydroxide solution or potassium hydroxide solution. The vinylformamide units may be completely or only partly hydrolyzed. Thus, polyvinylamines are obtained, for example, in the complete hydrolysis of homopolymers and N-vinylformamide.

Suitable anionic monomers are, for example, monomers comprising acid groups. Examples of these are acrylic acid, methacrylic acid, maleic acid, fumaric acid, itaconic acid, vinylphosphonic acid, acrylamido-2-methylpropanesulfonic acid, styrenesulfonic acid, allylacetic acid, crotonic acid and ethacrylic acid. The anionic monomers can be used in the polymerization in the form of a free acid or in a form partly or completely neutralized with alkali metal, alkaline earth metal and/or ammonium bases. The sodium salts or potassium salts of the acids are preferred. Both the unhydrolyzed copolymers of N-vinylformamide with anionic monomers and the partly or completely hydrolyzed copolymers of N-vinylformamide and anionic monomers, which are described, for example, in DE-A 103 15 363 mentioned in connection with the prior art (cf. in particular page 5, line 39 to page 12, line 39), can be used as binders for modifying inorganic pigments.

N-Vinylformamide can also be copolymerized with cationic monomers, such as dialkylaminoalkyl(meth)acrylates and/or diallyldimethylammonium chloride. The basic monomers are preferably used in the form of the salts with mineral acids or in a form partly or completely quaternized with alkyl halides or with dimethyl sulfate. In the copolymerization of N-vinylformamide with anionic and/or cationic monomers, nonionic monomers, such as methyl acrylate, ethyl acrylate, methyl methacrylate, vinyl acetate, acrylamide and/or methacrylamide, can, if appropriate, additionally be used. Both the hydrolyzed cationic and the unhydrolyzed cationic copolymers can be used as binders for modifying inorganic pigments. It is also possible to use amphoteric polymers which are obtainable, for example, by copolymerization of N-vinylformamide, dimethylaminoethyl acrylate methochloride and acrylic acid or which form these copolymers by complete or partial hydrolysis of the vinylformamide units. The polymers which comprise vinylformamide and/or vinylamine units and are used for modifying pigments preferably have an average molar mass $M_w$ of at least 20 000. In general, the average molar masses of the copolymers are in the range from 30 000 to 5 million, in particular from 50 000 to 2 million. The molar masses are determined, for example, with the aid of static light scattering at pH 7.6 in a 10 mmolar aqueous sodium chloride solution.

Polymer-pigment hybrids also form if the aqueous suspensions disclosed in DE-A 102 09 448 and DE-A 103 15 363 and comprising finely divided fillers, which are at least partly coated with polymers and are obtainable by mixing aqueous suspensions of finely divided fillers with at least one polymeric binder or with at least one water-soluble amphoteric, hydrolyzed copolymer of N-vinylformamide and at least one ethylenically unsaturated carboxylic acid having 3 to 8 carbon atoms and/or the alkali metal, alkaline earth metal or ammonium salts thereof, are dried, for example at temperatures of >95 to 140° C., preferably from 100 to 120° C., the dried product is, if appropriate, comminuted and sieved and the powder thus obtainable and having a mean particle size of from about 1 to 10 μm is dispersed in water.

The milling of inorganic pigments in an aqueous medium in the presence of at least one binder for the preparation of the polymer-pigment hybrids to be used according to the invention can also advantageously be carried out in the presence of polyethylene waxes and, if appropriate, at least one dispersant. Particularly suitable dispersants are polyacrylic acid, which are obtainable by polymerization of acrylic acid in isopropanol under superatmospheric pressure at temperatures up to 140° C. The polyacrylic acids suitable as dispersants have an average molar mass $M_w$ of, for example, from 1000 to 50 000, preferably from 2000 to 30 000. If polyethylene waxes are additionally used in the milling of the pigments, they are used, for example, in amounts of from 0.1 to 10, preferably from 1 to 5, % by weight, based on inorganic pigment. Polyethylene waxes are known. They are prepared, for example, by polymerization of ethylene and at least one ethylenically unsaturated carboxylic acid. Particularly suitable polyethylene waxes are those which are obtainable by copolymerization of (A) from 26.1 to 39% by weight, preferably from 26.3 to 35% by weight, particularly preferably from 26.5 to 38.9% by weight, of at least one ethylenically unsaturated carboxylic acid and (B) from 61 to 73.9% by weight, preferably from 65 to 73.7, particularly preferably from 70 to 73.5, % by weight of ethylene.

Also suitable are ethylene copolymer waxes which comprise (A') from 20.5 to 38.9% by weight, preferably from 21 to 28% by weight, of at least one ethylenically unsaturated carboxylic acid, (B') from 60 to 79.4% by weight, preferably from 70 to 78.5% by weight, of ethylene and (C') from 0.1 to 15% by weight, preferably from 0.5 to 10% by weight, of at least one ethylenically unsaturated carboxylate incorporated in the form of polymerized units.

The ethylene copolymer waxes described above have, for example, a melt mass flow rate (MFR) in the range from 1 to 50 g/10 min, preferably from 5 to 20 g/10 min, particularly preferably from 7 to 15 g/10 min, measured at 160° C. and a load of 325 g according to EN ISO 1133. Their acid number is usually from 100 to 300 mg KOH/g of wax, preferably from 115 to 230 mg KOH/g of wax, determined according to DIN 53402.

They have a kinematic melt viscosity ν of at least 45 000 $mm^2/s$, preferably of at least 50 000 $mm^2/s$. The melting range of the ethylene copolymer waxes are, for example, in the range from 60 to 110° C., preferably in the range from 65 to 90° C., determined by DSC according to DIN 51007.

The melting ranges of the ethylene copolymer waxes may be broad and may have a temperature range of at least 7 to not more than 20° C., preferably at least 10° C. and not more than 15° C.

The melting points of the ethylene copolymer waxes can, however, also have a small range of variation and may be in a temperature range of less than 2° C., preferably less than 1° C., determined according to DIN 51007.

The density of the waxes is usually from 0.89 to 1.10 g/cm$^3$, preferably from 0.92 to 0.99 g/cm$^3$, determined according to DIN 53479.

Ethylene copolymer waxes used in the dispersions used according to the invention may be alternating copolymers or block copolymers or preferably random copolymers.

Ethylene copolymer waxes comprising ethylene and ethylenically unsaturated carboxylic acids and, if appropriate, ethylenically unsaturated carboxylates can advantageously be prepared by free radical copolymerization under high pressure conditions, for example in stirred high-pressure autoclaves or in high-pressure tubular reactors. The preparation in stirred high-pressure autoclaves is preferred. Stirred high-pressure autoclaves are known per se, and a description is to be found in Ullmann's Encyclopedia of Industrial Chemistry, 5th Edition, key words: Waxes, Vol. A 28, page 146 et seq., Verlag Chemie, Weinheim, Basle, Cambridge, New York, Tokyo, 1996. In them, the length/diameter ratio is predominantly in the range from 5:1 to 30:1, preferably from 10:1 to 20:1. The high-pressure tubular reactors which may also be used are likewise described in Ullmann's Encyclopedia of Industrial Chemistry, 5th Edition, key words: Waxes, Vol. A 28, page 146 et seq., Verlag Chemie, Weinheim, Basle, Cambridge, New York, Tokyo, 1996.

Suitable pressure conditions for the polymerization are from 500 to 4000 bar, preferably from 1500 to 2500 bar. Conditions of this type are also referred to below as high pressure. The reaction temperatures are in the range from 170 to 300° C., preferably in the range from 195 to 280° C. The polymerization can also be carried out in the presence of a regulator. The abovementioned waxes are described in detail, for example, in WO 04/108601, page 2, line 38 to page 12, line 10.

The invention also relates to the use of aqueous suspensions of polymer-pigment hybrids, which are obtainable
(i) by milling an aqueous suspension of at least one inorganic pigment in the presence of at least one binder or
(ii) by drying the aqueous suspension obtainable according to (i) and redispersing the dried polymer-pigment hybrid in water,
as an additive to the paper stock for the production of filler-containing paper, filler-containing cardboard or filler-containing board by draining the paper stock with sheet formation.

In the process according to the invention, for the production of paper or paper products, organic pigments, as described, for example, in WO 01/00712 and WO 01/00713, can, if appropriate, also be concomitantly used in addition to the polymer-pigment hybrids. The proportion of organic pigments is preferably less than 20 parts by weight, in particular less than 10 parts by weight, particularly preferably less than 5 parts by weight, based on 100 parts by weight of polymer-pigment hybrid.

Binder and inorganic pigment are present at least partly in the form of pigment-polymer hybrids. In these hybrids, the organic polymer or binder is chemically or physically bound to the inorganic pigment. In particular, the binder is adsorbed on the pigment surface.

The pigment-polymer hybrids constitute an independent particle type having a uniform density. On measurement of the density of the pigment-polymer hybrids using an ultracentrifuge by the static density gradient method (21° C. and 1 bar), only one density, i.e. one particle type, is determined. The method of measurement for determining the static density gradient is described, for example, in W. Mächtle, M. D. Lechner, Progr. Colloid Polym. Sci (2002) 119,1.

For investigating a sample by the static density gradient (stat. DG) method, a mixture of light solvent and heavy solvent or additive (as a rule metrizamide/H$_2$O, metrizamide/D$_2$O) is centrifuged at moderate rotor speeds for at least 22 hours. The different sedimentation and diffusion behavior of heavy and light agents leads to the formation of a concentration gradient and hence a density gradient over the cell. Every radial position of the measuring cell therefore has a different solvent density. The sample and the chemically different components of the sample settle out or float within this density gradient exactly at the radial position at which a mixing ratio of light and heavy agent which corresponds to its particle density is present. This permits a highly accurate fractionation of samples according to the density and hence the chemical composition.

Since, in the investigated system comprising polymer (about 1 g/cm$^3$), calcium carbonate (from 2.6 to 2.95 g/cm$^3$, depending on modification) and polymer/carbonate hybrid, the densities of the particles differ radically, the detection of free polymer or the exclusion of free polymer can be effected by means of measurements of the hybrids in suitable static density gradients.

In addition to binder and inorganic pigment, the pigment-polymer hybrids may comprise further components, for example dispersants, such as at least one polycarboxylic acid or salts thereof, in particular polyacrylic acid, or polyphosphoric acid. The aqueous suspension of polymer-pigment hybrid can, if appropriate, comprise from 0.01 to 2% by weight of at least one dispersant.

EXAMPLES

The stated percentages in the examples are percentages by weight, unless otherwise evident from the context.

The polymer-pigment hybrid according to suspension 1 was prepared according to the teaching of FR-A 04 07 806 of Omya.

Aqueous filler suspensions prepared under suspension 1 and suspension 2 were tested in example 1 and in comparative examples 1 and 2, in each case for their suitability for the production of filler-containing papers. The results obtained are summarized in table 2.

The polymer-pigment hybrids were characterized by the static density gradient method described above.

The mean particle size of the pigments or of the polymer-pigment hybrids was determined on the basis of Fraunhofer diffraction by means of a Beckman Coulter Counter apparatus of the type LS 230.

The sample preparation for the particle size distribution measurement was carried out as follows:
   0.4 g of Polysalz S (dispersant based on polyacrylic acid) was added to 90 ml of a 0.1% strength by weight sodium pyrophosphate solution.
   4 g of the pigment or polymer-pigment hybrid were added to 90 ml of a 0.1% strength by weight sodium pyrophosphate.
   The remaining volume was made up to 100 ml by means of a 0.2% strength by weight sodium pyrophosphate solution.

The sample was stirred for 3 minutes and then treated with ultrasound for 10 minutes and then measured with the aid of a Beckman Coulter Counter apparatus.

Suspension 1

200 kg of a calcium carbonate powder having a mean particle size D 50 of 7.0 µm was suspended in 1000 liters of water by slowly stirring in by means of a blade stirrer. 38 kg of a 50% strength commercial aqueous styrene-acrylate dispersion (Acronal® S 728) were then mixed into the calcium carbonate slurry with continuous stirring. In addition, 4 kg of a 25% strength commercial aqueous dispersion of a polyethylene wax (Poligen® WE 4) were mixed into the calcium carbonate slurry with continued stirring. The slurry was then diluted to a solids content of 20% by dilution with drinking water. It had a pH of 8.5.

This 20% strength pigment suspension was then milled in a ball mill to a mean particle size of 2.5 µm. In the investigation of the aqueous suspension thus obtained, which was a polymer-pigment hybrid, no free binder was found with the aid of the ultracentrifuge.

Suspension 2 (According to the Teaching of DE-A 102 09 448)

200 kg of a calcium carbonate powder (Omyacarb® 2 AV) having a mean particle size D 50 of 2.4 µm was suspended in 1000 liters of water by slowly stirring in by means of a blade stirrer. 38 kg of a 50% strength commercial aqueous styrene-acrylate dispersion (Acronal® S 728) were then mixed into the calcium carbonate slurry with continuous stirring. In addition, 4 kg of a 25% strength commercial aqueous dispersion of a polyethylene wax (Poligen® WE 4) were mixed into the calcium carbonate slurry with continued stirring. The slurry was then diluted to a solids content of 20% by adding drinking water. It had a pH of 8.5.

In the investigation of the resulting aqueous suspension with the aid of the ultracentrifuge, 100% of free polymer (Acronal® S 728 and Poligen® WE 4) was found in the polymer-pigment mixture.

Suspension 3 (According to the Teaching of DE-A 103 15 363)

227 kg of an 11% strength solution of a commercially available amphoteric copolymer (Catiofast® PR 8236) were mixed with 2000 kg of a 50% strength calcium carbonate slurry (Omyacarb® HO) having a median particle size D 50 of 1.0 µm, with constant stirring. The slurry was then diluted to a solids content of 20% by addition of drinking water. It had a pH of 8.5.

General Method for the Production of Filler-Containing Paper

A mixture of bleached birch and pine was beaten in the weight ratio of 70/30 and with a consistency of 8% in the pulper until free of fiber bundles. A freeness of 300 Schopper-Riegler was established. The pH of the paper stock was in the range from 7 to 8. The beaten paper stock was then diluted to a consistency of 1% with drinking water.

The cationic starch used was Hicat® 5163 A, in a dose of 8 kg per metric ton of dry paper.

The optical brightener used was Blankophor® PSG, in a dose of 3 kg per metric ton of paper.

The retention aid used was a cationic retention aid (Polymin® KE 2020), the metered amount of retention aid remaining constant in every experiment (0.02 kg per metric ton of dry paper). The amount of filler metered was varied until the ash content of the paper produced with the stock was 30%.

The size used as an AKD (alkylketene dimer) dispersion (Basoplast® 2009 LC), the metered amount of the size being adjusted in each experiment so that the Cobb (60) value was 30 g/m$^2$.

The paper stock described above was then processed in each case in an experimental paper machine to give a paper having a basis weight of 80 g/m$^2$. 3 papers which differed only in the type of filler used in each case were produced by this method.

Paper 1: The filler used was a commercial calcium carbonate (Omyacarb® 2 AV) in aqueous suspension (comparative example 1)

Paper 2: According to example 1, the polymer-pigment hybrid according to suspension 1 was used.

Paper 3: According to comparative example 2, the filler used was the mixture according to suspension 2 (prepared according to the teaching of DE-A 102 09 448).

Paper 4: According to comparative example 3, the filler used was the mixture according to suspension 3 (prepared according to the teaching of DE-A 103 15 363).

Table 1 gives an overview of the production of papers 1 to 3 having a filler content of 30% in each case.

TABLE 1

|  | Comparative ex. 1 | Example 1 | Comparative ex. 2 | Comparative ex. 3 |
| --- | --- | --- | --- | --- |
| 70/30 birch/pine - wood-free | 100 | 100 | 100 | 100 |
| Omyacarb ® 2 AV [% in paper] | 30 |  |  |  |
| Polymer-pigment hybrid from suspension 1 [% in paper] |  | 30 |  |  |
| Suspension 2 [% in paper] |  |  | 30 |  |
| Suspension 3 [% in paper] |  |  |  | 30 |
| Basoplast ® 2009 LC | Adapted to Cobb 30 g/m$^2$ | Adapted to Cobb 30 g/m$^2$ | Adapted to Cobb 30 g/m$^2$ | Adapted to Cobb 30 g/m$^2$ |
| Hicat ® 5163 A [kg/t] | 8 | 8 | 8 | 8 |
| Blankophor ® PSG [kg/t] | 3 | 3 | 3 | 3 |
| Polymin ® KE 2020 [kg/t] | 0.2 | 0.2 | 0.2 | 0.2 |
| Paper No. | 1 | 2 | 3 | 4 |

The running properties during the production of the papers were rated qualitatively on the basis of deposits in the wet end and dry end of the paper machine and on the basis of the tendency to froth in the white water container and the frequency of tearing during the experiments. The results are shown in table 3.

Testing of the Paper Sheets

After a storage time in a conditioned chamber at a constant 23° C. and 50% relative humidity for 24 hours, the following paper tests were carried out:

Folding endurance according to ISO 5626
Tear propagation strength according to DIN 53115
Structural strength according to ISO TC 6/SC 2
Scott Bond according to DIN 20 187
Taber Test according to DIN 53 863/1
Bendtsen porosity according to ISO 5636-3
Opacity according to DIN 53146
Toner adhesion according to DIN V EN V 12 283.

The results obtained thereby are summarized in table 2.

TABLE 2

|  | Paper No. | | | |
| --- | --- | --- | --- | --- |
|  | 1 | 2 | 3 | 4 |
|  | Example No. | | | |
|  | 1 | | | |
|  | | Comparative example No. | | |
|  | | 1 | 2 | 3 |
| Folding endurance, longitudinal mN | 32.8 | 54.6 | 50.4 | 30.9 |
| Folding endurance, transverse mN | 22.6 | 33.2 | 30.7 | 27.6 |
| Tear propagation resistance, longitudinal Nm | 870 | 1108 | 986 | 912 |
| Tear propagation resistance, transverse Nm | 904 | 1162 | 1078 | 950 |
| Zwick structural strength N | 350.8 | 567 | 580.9 | 378 |
| Scott Bond, transverse Mj | 157 | 416 | 302 | 181 |
| Bendtsen porosity ml/min | 454 | 134 | 265 | 353 |
| Opacity | 89.01 | 87.8 | 85.8 | 88.4 |
| Taber - top mg | 100 | 17.5 | 31.5 | 56 |
| Taber - bottom mg | 123 | 26 | 44 | 84 |
| Toner adhesion | 44 | 72 | 62 | 70 |

TABLE 3

Running properties of the paper machine during the production of the papers

|  | Paper | | | |
| --- | --- | --- | --- | --- |
|  | 1 GCC 30% | 2 Hybrid 30% | 3 Mixture 30 | 4 Amphoteric polymer 30% |
| Tendency to form deposits Press section | no deposition | no deposition | substantial deposition | no deposition |
| Tendency to froth | none | none | none | none |
| Tears | none | none | none | none |

Papers 1 to 4 have comparable basis weights and ash contents. They are comparable with one another in these respects.

As is evident from the paper tests, the papers comprising polymer-pigment hybrid (example 1 and paper 2) have substantially improved properties with respect to strengths (such as Scott Bond, tear propagation resistance and folding endurance), surface properties (such as Taber) and optical properties (such as opacity) in combination with substantially improved running properties of the paper produced according to the comparative example in comparison with a paper according to comparative examples 2 and 3 (papers 3 and 4 in table 3).

The polymer-pigment hybrids can be processed in the form of aqueous pigment suspensions with good running properties of the paper machine to give paper in which the strength properties, optical properties and surface properties are improved compared with conventional papers. Moreover, the papers produced by the process according to the invention do not form dusts in the copying process to the extent of papers which comprise untreated filler.

Production of Filler-Containing Papers 1

A typical SC stock (composition: 70% of groundwood, beaten until free of fiber bundles, 10% broke, beaten until free of fiber bundles and 20% of sulfate pulp, freeness 35° SR) was adjusted to a consistency of 0.4% with drinking water.

In order to determine the behavior of suspension 1 described in comparison with clay and GCC in the production of filler-containing paper, in each case 500 ml of the paper stock suspension was initially taken and said fillers and a combination of cationic retention aids (Polymin® SK and Polymin® KE 2020) were metered into this pulp.

The amount of retention aids and of pigment slurry was adjusted by means of a plurality of preliminary experiments so that the filler content stated below was achieved.

The paper sheets were each produced on a Rapid-Kö then sheet former according to ISO 5269/2 with a sheet weight of 52 g/m$^2$ and then dried to a moisture content of 10% and then calendered 3 times at 90° C. with a nip pressure of from 90 daN/cm.

After a storage time in a conditioned chamber at a constant 23° C. and 50% atmospheric humidity for 24 hours, the following paper tests were carried out:

Tensile strength: DIN 54540
Roughness: ISO 8791/2-90
Air permeability: DIN 53120 TOI-98, ISO 5636/3-92
Light scattering: DIN 54500 96
Light adsorption: DIN 54500 96

The properties of the calendered papers are shown in table 4.

TABLE 4

|  | Comp. example 4 Clay | Comp. example 5 GCC (precipitated CaCO$_3$) | Example 2 Suspension 1 (hybrid) | Example 3 Suspension 1 (hybrid) |
| --- | --- | --- | --- | --- |
| Filler content [%] | 35 | 35 | 35 | 50 |
| Tensile strength [N] | 16 | 14 | 18 | 13 |
| Roughness (PPS) | 1.1 | 1.2 | 1.2 | 1.2 |
| Air permeability ml/min (Bendtsen) | 45 | 120 | 55 | 80 |
| Light scattering m$^2$/kg | 54 | 76 | 57 | 56 |
| Light absorption m$^2$/kg | 2.6 | 1.7 | 1.6 | 1.3 |

As is evident from table 4, in comparison with a clay-comprising paper according to comparative example 4, a paper comprising 50% of polymer-hybrid-pigment (example 3) nevertheless has paper properties like the standard.

Production of Filler-Containing Papers 2

Further SC stock (composition: 17% of chemical pulp, 46% of groundwood, beaten until free of fiber bundles) was adjusted to a solids concentration of 0.4% with water.

This paper stock was then processed in each case in a paper machine with the use of the starting materials mentioned in table 5 to give a paper having a basis weight of 54 g/m$^2$ at a speed of about 950 m/min. This method was used to produce 3 papers which differed in the type and amount of the filler used in each case. The retention aid used was a cationic retention aid (Polymin®) 8209). A cationic polymer (Catiofast® GM) was also used as fixing agent.

Paper 5: The filler used was a commercially available calcium carbonate, 21% in aqueous suspension (comparative example 6), and a commercially available kaolin with 14%.

Paper 6: According to the above example, the polymer-pigment hybrid according to suspension 1 (21% of polymer-pigment hybrid) and 14% kaolin were used.

Paper 7: The filler used was the polymer-pigment hybrid according to suspension 1 (31% of polymer-pigment hybrid) and 14% of kaolin.

Table 5 gives an overview of the production of papers 5 to 7.

TABLE 5

|  | Comparative ex. 6 | Example 4 | Example 5 |
|---|---|---|---|
| Chemical pulp | 17 | 17 | 18 |
| Groundwood | 46 | 46 | 37 |
| Calcium carbonate [% in paper] | 21 | 0 | 0 |
| Polymer-pigment hybrid from suspension 1 [% in paper] | 0 | 21 | 31 |
| Clay (kaolin) | 14 | 14 | 14 |
| Polymin ® 8209 | 0.3 | 0.3 | 0.44 |
| Catiofast ® GM | 0.03 | 0.03 | 0.05 |
| Paper No. | 5 | 6 | 7 |

During the production of the papers, no depositions were observed in the wet end and dry end of the paper machine. In addition, the tendency to foam in the whitewater container and the frequency of tearing were also normal during the experiments.

After a storage time in a conditioned chamber at a constant 23° C. and 50% relative humidity for 24 hours, the following paper tests were carried out:

Tensile strength: DIN 54540
Roughness: ISO 8791/2-90
Porosity: ISO 3687
Whiteness CIE: DIN 5 033

The properties of the calendered papers are shown in table 6.

TABLE 6

|  | Paper 5 | Paper 6 | Paper 7 |
|---|---|---|---|
| Filler content [%] | 35 | 35 | 45 |
| Tensile strength [N] | 25.8 | 29.5 | 26.4 |
| Roughness (PPS) | 1.36 | 1.17 | 1.12 |
| Porosity s (Gurley) | 560 | 730 | 855 |
| CIE whiteness | 76 | 76 | 75 |

As is evident from table 6, paper 7 with the high filler content of 45% (31% polymer-pigment hybrid and 14% clay (kaolin)) still has paper properties comparable with paper 4 (comparative example 6) having a total filler content of 35% (31% of calcium carbonate and 14% of clay (kaolin)). Furthermore, no problems occurred in the production of the papers.

We claim:

1. A process for making a filler-containing paper or product thereof, comprising:

dispersing at least one inorganic pigment and at least one polymer in water to obtain a first aqueous suspension;
milling said first aqueous suspension in a ball mill to obtain a second aqueous suspension comprising a polymer-pigment hybrid as a filler;
optionally drying said second aqueous suspension to obtain a dried polymer-pigment hybrid;
optionally redispersing the dried polymer-pigment hybrid in water;
adding said second aqueous suspension or the dried polymer-pigment hybrid redispersed in water to a paper stock; and
draining the paper stock to obtain a sheet,
wherein said at least one polymer is
a polydiene consisting of from 10 to 90% by weight of an aliphatic hydrocarbon having two double bonds, from 10 to 90% by weight of a vinylaromatic compound, from 0 to 20% by weight of an acid monomer, and from 0 to 20% by weight of a further monomer, or
a polyacrylate consisting of from 10 to 95% by weight of a $C_1$-$C_{10}$-alkyl (meth)acrylate, from 0 to 60% by weight of a vinylaromatic compound, from 0 to 20% by weight of an acid monomer, and from 0 to 10% by weight of a further monomer, and
wherein the milling of said first aqueous suspension is carried out in the presence of a polyethylene wax, said wax comprising, in copolymerized form,
from 26.1 to 39% by weight of at least one ethylenically unsaturated carboxylic acid, and
from 61 to 73.9% by weight of ethylene.

2. The process according to claim 1, wherein said at least one inorganic pigment is selected from the group consisting of titanium dioxide, alumina, aluminum hydroxide, kaolin, talc, dolomite, clay, bentonite, satin white, calcium carbonate, calcium sulfate and barium sulfate, which is present in said second aqueous suspension and in an amount of from 1 to 80% by weight during said milling.

3. The process according to claim 1, wherein the at least one inorganic pigment is calcium carbonate in the form of lime, chalk, calcite, marble, precipitated calcium carbonate, or a combination thereof.

4. The process according to claim 1, wherein said at least one polymer is
a polyacrylate consisting of from 10 to 95% by weight of a $C_1$-$C_{10}$-alkyl (meth)acrylate, from 0 to 60% by weight of a vinylaromatic compound, from 1 to 5% by weight of an acid monomer, and from 0 to 10% by weight of a further monomer.

5. The process according to claim 1, wherein said at least one polymer is
a polyacrylate consisting of from 10 to 95% by weight of a $C_1$-$C_{10}$-alkyl (meth)acrylate, from 0 to 60% by weight of a vinylaromatic compound, and from 1 to 5% by weight of an acid monomer.

6. The process according to claim 1, wherein a weight ratio of inorganic pigment to polymer in said first and second aqueous dispersions is between 99:1 and 1:1.

7. The process according to claim 1, wherein the second aqueous suspension comprising the polymer-pigment hybrid comprises from 5 to 80% by weight of said inorganic pigment, from 1 to 30% by weight of said polymer and from 19 to 94% by weight of water.

8. The process according to claim 1, wherein the second aqueous suspension comprising the polymer-pigment hybrid further comprises from 0.01 to 2% by weight of at least one dispersant.

9. The process according to claim 1, wherein the polymer-pigment hybrid has a mean particle diameter of from 0.01 to 50 μm.

10. The process according to claim 1, wherein said second aqueous suspension is added to the paper stock in an amount so that from 5 to 70% by weight of said polymer-pigment hybrid is present in the paper stock, based on the weight of dry paper stock.

11. The process according to claim 6, wherein a weight ratio of inorganic pigment to polymer in said first and second aqueous dispersions is between 70:1 and 30:1.

12. The process according to claim 10, wherein said second aqueous suspension is added to the paper stock in an amount so that from 20 to 50% by weight of said polymer-pigment hybrid is present in the paper stock, based on the weight of dry paper stock.

13. The process according to claim 1, wherein no free polymer is present in said second aqueous suspension after said milling is carried out.

14. The process according to claim 1, wherein said milling is carried out at a temperature of from 0 to 95° C.

15. The process according to claim 1, wherein said milling is carried out at a temperature of from 15 to 80° C.

16. The process according to claim 1, wherein said milling is carried out at a temperature of from 20 to 55° C.

17. The process according to claim 1, wherein said polymer-pigment hybrid comprises a chemical bond between the polymer and the pigment.

18. The process according to claim 1, wherein said polymer is adsorbed on a surface of said pigment.

19. The process according to claim 1, wherein said at least one polymer is
a polydiene consisting of from 10 to 90% by weight of an aliphatic hydrocarbon having two double bonds, from 10 to 90% by weight of a vinylaromatic compound, from 0 to 20% by weight of an acid monomer, and from 0 to 20% by weight of a further monomer.

20. The process according to claim 1, wherein said at least one polymer is
a polyacrylate consisting of from 10 to 95% by weight of a $C_1$-$C_{10}$-alkyl (meth)acrylate, from 0 to 60% by weight of a vinylaromatic compound, from 0 to 20% by weight of an acid monomer, and from 0 to 10% by weight of a further monomer.

21. The process according to claim 1, wherein said at least one polymer is
a polydiene consisting of from 10 to 90% by weight of butadiene, from 10 to 90% by weight of styrene, and from 0 to 20% by weight of an acid monomer.

22. The process according to claim 1, wherein said polyethylene wax has a melt mass flow rate in the range from 1 to 50 g/10 min measured at 160° C. and a load of 325 g according to EN ISO 1133.

23. The process according to claim 1, wherein said polyethylene wax has an acid number of from 100 to 300 mg KOH/g of wax, determined according to DIN 53402.

24. The process according to claim 1, wherein said polyethylene wax has a density of from 0.89 to 1.10 g/cm³, determined according DIN 53479.

25. A process for making a filler-containing paper or product thereof, comprising:
dispersing at least one inorganic pigment and at least one polymer in water to obtain a first aqueous suspension;
milling said first aqueous suspension in a ball mill to obtain a second aqueous suspension comprising a polymer-pigment hybrid as a filler;
optionally drying said second aqueous suspension to obtain a dried polymer-pigment hybrid;
optionally redispersing the dried polymer-pigment hybrid in water;
adding said second aqueous suspension or the redispersed polymer-pigment hybrid in water to a paper stock; and
draining the paper stock to obtain a sheet,
wherein said at least one polymer is
a polydiene consisting of from 10 to 90% by weight of an aliphatic hydrocarbon having two double bonds, from 10 to 90% by weight of a vinylaromatic compound, from 0 to 20% by weight of an acid monomer, and from 0 to 20% by weight of a further monomer, or
a polyacrylate consisting of from 10 to 95% by weight of a $C_1$-$C_{10}$-alkyl (meth)acrylate, from 0 to 60% by weight of a vinylaromatic compound, from 0 to 20% by weight of an acid monomer, and from 0 to 10% by weight of a further monomer, and
wherein the milling of said second aqueous suspension is carried out in the presence of a polyethylene wax, said wax comprising, in copolymerized form,
from 20.5 to 38.9% by weight of at least one ethylenically unsaturated carboxylic acid,
from 60 to 79.4% by weight of ethylene, and
from 0.1 to 15% by weight of at least one ethylenically unsaturated carboxylate.

26. The process according to claim 25, wherein said polyethylene wax has a melt mass flow rate in the range from 1 to 50 g/10 min measured at 160° C. and a load of 325 g according to EN ISO 1133.

27. The process according to claim 25, wherein said polyethylene wax has an acid number of from 100 to 300 mg KOH/g of wax, determined according to DIN 53402.

28. The process according to claim 25, wherein said polyethylene wax has a density of from 0.89 to 1.10 g/cm³, determined according DIN 53479.

* * * * *